United States Patent
Varga

(10) Patent No.: US 11,215,207 B2
(45) Date of Patent: Jan. 4, 2022

(54) FRICTIONAL TARP CLAMP

(71) Applicant: Robert C. Varga, Sandy, UT (US)

(72) Inventor: Robert C. Varga, Sandy, UT (US)

( * ) Notice: Subject to any disclaimer, the term of this patent is extended or adjusted under 35 U.S.C. 154(b) by 192 days.

(21) Appl. No.: 16/566,222

(22) Filed: Sep. 10, 2019

(65) Prior Publication Data

US 2020/0003240 A1 Jan. 2, 2020

Related U.S. Application Data

(62) Division of application No. 15/156,328, filed on May 16, 2016, now Pat. No. 10,408,244.

(60) Provisional application No. 62/162,697, filed on May 16, 2015.

(51) Int. Cl.
| | |
|---|---|
| *F16B 2/06* | (2006.01) |
| *F16B 2/18* | (2006.01) |
| *F16B 5/06* | (2006.01) |
| *F16B 2/00* | (2006.01) |
| *F16B 13/08* | (2006.01) |

(52) U.S. Cl.
CPC ............... *F16B 2/065* (2013.01); *F16B 2/18* (2013.01); *F16B 5/0692* (2013.01); *F16B 2/005* (2013.01); *F16B 13/0808* (2013.01)

(58) Field of Classification Search
CPC ......... F16B 2/005; F16B 2/065; F16B 5/0692
See application file for complete search history.

(56) References Cited

U.S. PATENT DOCUMENTS

| | | | | |
|---|---|---|---|---|
| 996,137 | A | * | 6/1911 | Praeger ............... F16B 2/065 248/507 |
| 1,077,787 | A | | 11/1913 | Bennett |
| 1,360,200 | A | | 11/1920 | Thomas |
| 1,869,947 | A | | 8/1932 | Shook |
| 2,258,822 | A | * | 10/1941 | Sturgiss ............... B25B 31/005 411/368 |
| 2,703,725 | A | | 3/1955 | Vagi |
| 2,771,259 | A | | 11/1956 | Laystrom |
| 3,856,424 | A | * | 12/1974 | Beck, Jr. ............... F16B 5/02 403/227 |
| 3,973,298 | A | | 8/1976 | Moser |
| 4,027,360 | A | | 6/1977 | Moser |
| 4,455,790 | A | | 6/1984 | Curle |
| 4,526,083 | A | | 7/1985 | LeMert |

(Continued)

FOREIGN PATENT DOCUMENTS

| | | |
|---|---|---|
| DE | 20 2014 105 511 U1 | 2/2015 |
| GB | 451922 | 8/1936 |

*Primary Examiner* — Flemming Saether
(74) *Attorney, Agent, or Firm* — Thorpe North & Western, LLP

(57) ABSTRACT

A threaded shaft extends from a base which has an inner and outer surface. A disc with an inner and outer surface is comprised of a resilient and slip-resistant material, such as emulsion styrene-butadiene rubber (E-SBR). The disc has a non-threaded opening which is slidably received by the threaded shaft, allowing the disc to slide toward or away from the base inner surface. A washer has a non-threaded opening that allows it to be slidably received by the threaded shaft, allowing the washer to move with the disc outer surface. A fastener, with a threaded opening, mates with the threaded shaft and reversibly tightens the disc toward the base inner surface. A section of tarp or other sheet material can be securely held between the base and the disc.

10 Claims, 6 Drawing Sheets

(56) References Cited

U.S. PATENT DOCUMENTS

| | | | |
|---|---|---|---|
| 4,810,145 A | 3/1989 | Villas | |
| 5,341,760 A | 8/1994 | Summers | |
| 5,367,939 A * | 11/1994 | Barker | G10D 13/06 446/421 |
| 7,189,024 B2 | 3/2007 | Cameron | |
| 7,243,402 B2 | 7/2007 | Andersen et al. | |
| 7,423,211 B2 | 9/2008 | Hsieh | |
| 7,996,963 B2 | 8/2011 | Cameron | |
| 8,122,572 B2 | 2/2012 | Waddell et al. | |
| 8,621,726 B2 | 1/2014 | Sublette | |
| 8,991,448 B2 | 3/2015 | White | |
| 9,127,702 B2 | 9/2015 | Pressler et al. | |
| 9,174,518 B2 | 11/2015 | Wilson et al. | |
| 9,267,517 B2 | 2/2016 | Wilson et al. | |
| 9,422,957 B2 | 8/2016 | Dinh | |
| 9,863,576 B1 * | 1/2018 | Cifers | F16B 35/06 |
| 10,353,272 B2 * | 7/2019 | Yowler | G03B 15/02 |
| 2004/0182222 A1 * | 9/2004 | Demers | G10D 13/06 84/422.3 |

\* cited by examiner

FRICTIONAL TARP CLAMP

PRIORITY CLAIM

This application is a Divisional of application Ser. No. 15/156,328, filed May 16, 2016, now U.S. Pat. No. 10,408,244, which claims the priority of U.S. Provisional Patent Application Ser. No. 62/162,697, filed on May 16, 2015.

BACKGROUND

Field of the Invention

The present invention relates to devices for clamping tarps and other flexible sheet materials.

Related Art

The current invention provides a clamp for flexible sheet material such as a tarp or flexible sheet plastic material used for covering items such as pickup truck beds, flatbed truck beds, or any items needing covering, such as piles of materials needing protection from the elements or holes in items that need covering, such as holes in building roofs. For purposes of this application, all such flexible sheet materials will be referred to as tarps. As usually used, a tarp is a strong, flexible, water-resistant sheet material that provides protection from the elements and comes in various material types and thickness. For example, a tarp may be constructed from polyethylene, canvas, or vinyl, and the thickness can range from regular duty to heavy duty. Many tarps have grommets which are normally comprised of rings inserted into holes in the tarps along the sides and the corners. The grommets provide attachment points for ropes and bungee cords, which allow the tarps to be placed over items requiring protection from the elements and to be tied down, which effectively protect such covered items against weather damage. Tarps are also commonly used to cover pickup truck beds or trailer beds to cover loads of material being carried by such trucks or trailers to keep such materials from blowing from the truck or trailer beds while traveling on highways. Tarps are commonly used to cover loads of brush or other trash being transported to disposal sites. When grommets are provided in the tarp, they can be used to secure the tarp over the item needing protection or over the load needing protection and restraint. Tarps are also functional without using or without having grommets. For example, a tarp can be used to cover a load of material in a truck by covering the material with a tarp, and securing the tarp by means of ropes that are tied to the sides of the truck, and secured tightly over the tarp.

However, there are a number of problems with tying down a tarp by using grommets and/or ropes. First, the grommets are not necessarily present in the optimal location for tying down the tarp. Second, the grommets are not necessarily strong enough to withstand the strain caused by the tension of the rope, which can result in the premature tearing of the fabric surrounding the grommet. Third, if the grommet breaks, then it is necessary to replace the grommet, which is difficult without the proper tools.

Additionally, for tarps not provided with grommets, it may be difficult and time consuming to use rope to tie down the tarp. When using rope to secure a tarp on or over a truck bed, several problems can arise. First, the tarp will not be evenly secured over the truck bed unless a lot of rope is used, and the rope is secured in a fastidious manner. Second, securing the rope over the tarp in this manner takes unnecessary time because the rope must be secured tightly over the load after the load has been placed in the truck bed, and the rope must be removed when removing the load from the truck bed.

The prior art has addressed these shortcomings in various ways, including piercing and clamping. In U.S. Pat. No. 7,189,024, a connector assembly allows a rope to be attached to a tarp by piercing the tarp and screwing the opposing ends of the connector members to each other. Each connector member comprises a mostly flat surface with multiple bumps on the surface. The bumps keep the connector members from moving in relation to each other, and the piercing mechanism keeps the two connecting members attached to each other. The bumps also provide a stronger grip on the tarp being held between the two connector members. In U.S. Pat. No. 9,267,517, a sheet material clamp uses an actuating screw in combination with an upper and lower clamping jaw in which the clamping jaws are designed to clasp together and maintain a grip on the sheet material. The clamping jaws are formed of a rigid material and each have an uneven surface to prevent the material in between the clamping jaws from slipping from between the jaws.

There are deficiencies with both of these prior art references. Most importantly, neither prior art reference addresses the problem of tying down a tarp over a truck bed. In addition, both prior art references are concerned with fixing problems with grommets, but fail in even this respect. Piercing the material of a tarp has the effect of creating holes in the material when no holes are necessary and is likely to shorten the lifetime of the tarp. Although this might secure the tarp initially, this method provides little advantage over using grommets, which provide the very function that this prior art is hoping to achieve. Clamping a tarp does not have this disadvantage of creating holes in the material of the tarp, but does have the disadvantage of ripping and tearing the material of the tarp because of the shape of the clamping jaws and their uneven surface.

Based on the foregoing, there exists a need for a tarp clamping device that does not rely on ropes or grommets, or on piercing the material of the tarp. Furthermore, this new device must use a clamping mechanism that does not rip or tear the material of the tarp by using clamping jaws with an uneven surface. Therefore, there is a need for a tarp clamping device that can clamp the material of the tarp by evenly distributing pressure from the clamping jaws while still maintaining a firm grip on the tarp.

SUMMARY OF THE INVENTION

The current invention provides a clamp for use with flexible sheet material, in which a threaded shaft extends from a base with an inner base surface and an outer base surface. The threaded shaft extends from the inner base surface, and can also extend from the outer base surface. A clamping disc, with an inner disc surface and an outer disc surface, includes a non-threaded opening slidably received on the threaded shaft to enable the disc to slide along the shaft toward or away from the inner base surface. A fastener, with a threaded opening, mates with the threaded shaft and reversibly moves the clamping disc toward the inner base surface. The fastener can be a wing knob or any other device that can be rotated by a user to move the clamping disc toward and against the inner base surface to enable the sheet material to be clamped between the inner base surface and the inner clamping disc surface. The clamping disc can be formed of a slightly resilient material that provides a slip-resistant surface to hold the sheet material clamped between the inner disc surface and the inner base surface. Such material can be a crumb rubber mat material made from an emulsion styrene-butadiene rubber (E-SBR) which generally is formed from recycled tires. When using a slightly resilient material for the clamping disc, a rigid washer, such as a metal washer, is positioned between the fastener and the clamping disc to spread the clamping force from the fastener across a large interior portion of the clamping disc.

In one embodiment of the clamp of the invention, the base itself is a disc formed from the slightly resilient and slip-resistant material, such as the crumb rubber mat material, with a threaded opening formed by a rigid insert comprised of metal, plastic, or any other suitable material. In such embodiment, the threaded shaft extends through the base so that it extends from both the inner and the outer base surfaces. The base is secured to a mounting surface, such as the top of a side wall forming the side of a pickup truck bed, by passing the portion of the threaded shaft extending from the outer base surface through a mounting hole in the mounting surface and attaching the threaded shaft in the mounting hole by a fastener, such as toggle bolt or a nut threaded onto the threaded shaft. The mounting surface is then sandwiched between the base and the fastener threaded to the threaded shaft on the opposite side of the mounting surface to secure the clamp to the mounting surface.

In yet another embodiment, the base is comprised of a rigid plate with the threaded shaft extending from the inner surface of the plate. The base may further contain multiple holes therethrough that can be used for securing the base to a surface, such as a roof, walls, or floor of a building, or any other surface upon which the base can be secured, such as with screws or nails.

In another embodiment, the base is a second disc made of a slightly resilient and slip-resistant material, such as the crumb rubber mat material, having a non-threaded hole therethrough, similar to the clamping disc so both the clamping disc and the base can slide along the threaded shaft and the threaded shaft extends from both surfaces of the base. The non-threaded openings can be reinforced with a rigid insert made of metal or any other suitable material, if desired. Fasteners, with threaded openings, mate with the threaded shaft on opposite end thereof and reversibly move the clamping disc toward and the base toward one another. The fasteners can be wing knobs or any other devices that can be rotated by a user to move the clamping disc and the base toward one another to enable the sheet material to be clamped between the inner base surface and the inner disc surface. Rigid washers, such as metal washers, are positioned between the fasteners and the clamping disc and the base to spread the clamping force from the fastener across large interior portions of the clamping disc and the base.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Figure 1:
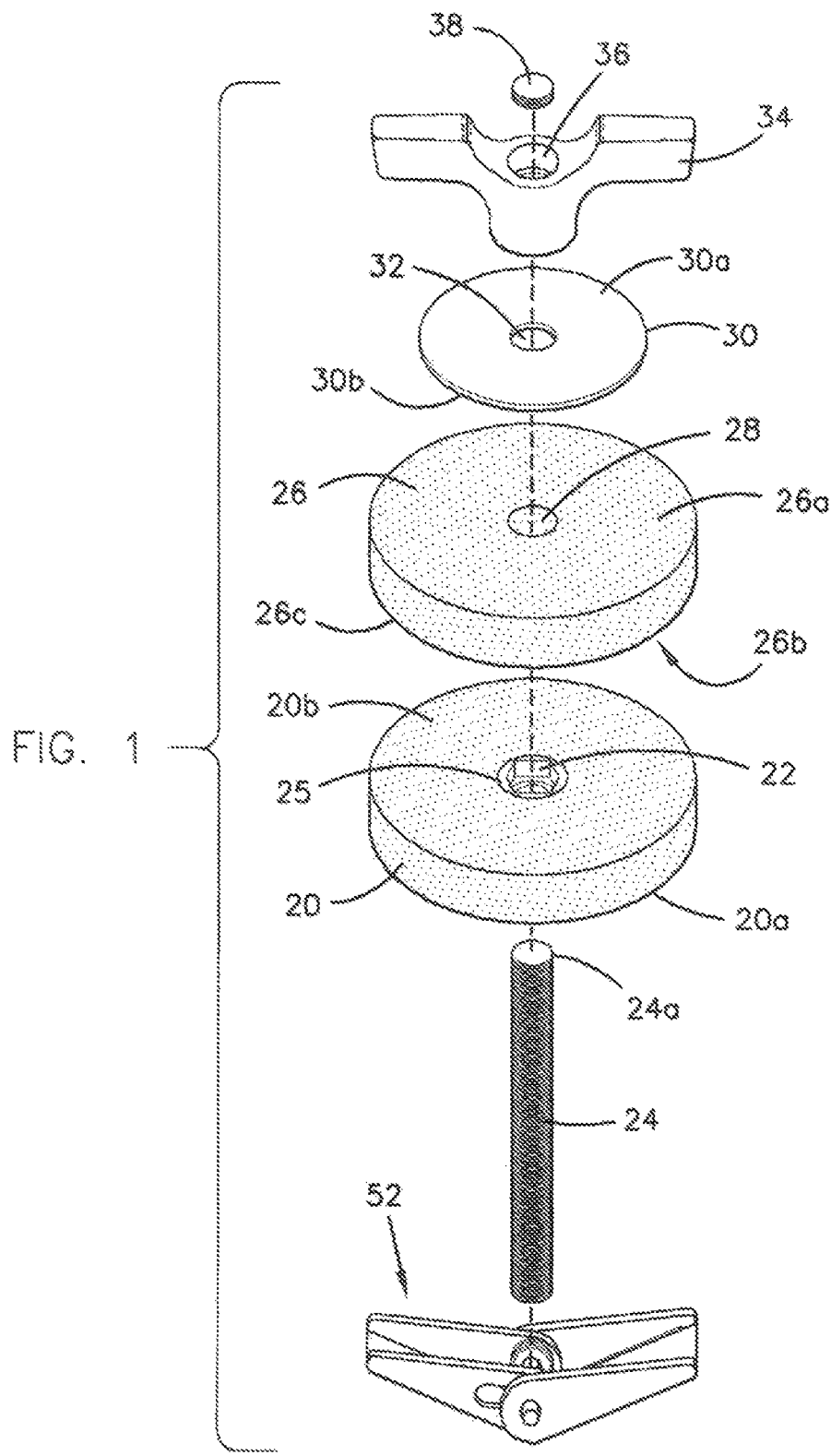
FIG. 1 is a perspective assembly view of a frictional tarp claim in accordance with an embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

In the embodiment of the invention illustrated in FIGS. 1-6, the clamp includes a base 20 having a threaded base opening 22 that mates with a threaded shaft 24. The threaded base opening 22 may be formed by a rigid insert, such as a metal or plastic insert 25, secured in base 20. Threaded base opening 22 allows the base 20 to be rotated to move it from end to end along threaded shaft 24, and also secures the base 20 in a particular position along threaded shaft 24. The base 20 has an outer base surface 20a and an inner base surface 20b. As shown in FIGS. 1-5, base 20 is in the form of a disc with the threaded opening 22 centered in the disc. A clamping disc 26 is received on the portion of threaded shaft 24 which extends from inner base surface 20b, with threaded shaft 24 extending through a non-threaded opening 28 extending through clamping disc 26. This non-threaded opening 28 allows the clamping disc 26 to freely slide along threaded shaft 24 toward and away from the inner base surface 20b. This non-threaded opening can be reinforced with a rigid insert made of metal or any other suitable material, if desired. The clamping disc 26 has an inner disc surface 26b, which faces the inner base surface 20b, and an outer disc surface 26a, which is on the opposite side of the clamping disc from the inner disc surface 26b. A washer 30 is received on the portion of threaded shaft 24 extending from disc outer surface 26a, with threaded shaft 24 extending through a non-threaded washer opening 32. This allows washer 30 to freely slide along the threaded shaft 24 and slide with clamping disc 26 toward or away from outer disc surface 26a. The washer 30 has an inner washer surface 30b, which faces the clamping disc's outer disc surface 26a, and an outer washer surface 30a, which is on the opposite side of the washer 30 from the washer inner surface 30b.

A wing knob 34 is received on the portion of threaded shaft 24 extending from outer washer surface 30a, with threaded shaft 24 extending through a threaded knob opening 36. This allows wing knob 34 to be rotated in one direction to move along shaft 24 toward the outer washer surface 30a and in the opposite direction to move along the shaft 24 away from the outer washer surface 30a and toward shaft end 24a. The end 24a of threaded shaft 24 may be treated to prevent the wing knob 34 from being screwed off the end 24a. In the illustrated embodiment, the end 24a is coated with a plastic material 38 which keeps wing knob 34 from being screwed off the threaded end 24a. This prevents wing knob 34 from being separated from the clamp during use and becoming lost or requiring rethreading to again attach it to the threaded shaft 24, which can be difficult to do during a clamping operation. Plastic material 38 may be placed on shaft end 24a by dipping shaft end 24a into a container of liquid plastic material to allow liquid plastic material to stick to the shaft end 24a, and then removing the shaft end 24a from the liquid plastic material and letting the liquid plastic material sticking to the shaft end 24a harden on the shaft end 24a.

Figure 5:
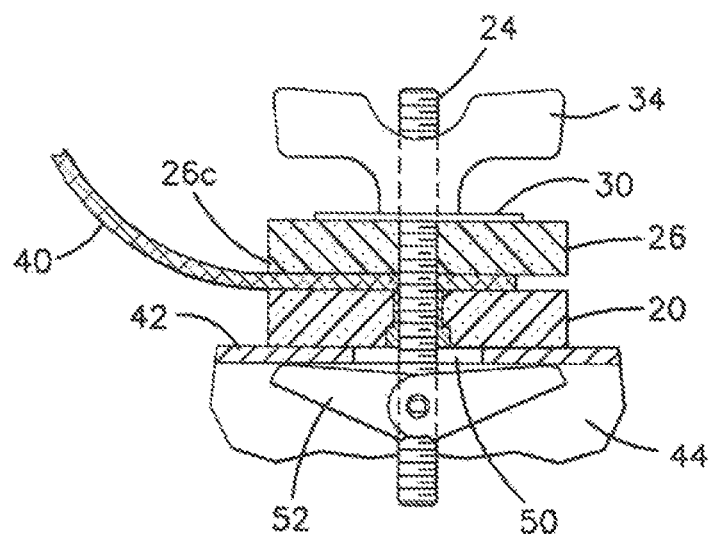
FIG. 5 is a vertical section of the frictional tarp clamp of FIG. 4 in secured position in the stake pocket hole and showing a portion of sheet material clamped in the clamp.

With the construction described, when desired to clamp sheet material using the clamp, wing knob 34 is rotated on threaded shaft 24 to move wing knob 34 in a direction along threaded shaft 24 away from base 20. Since base 20 is threaded onto shaft 24, and as long as shaft 24 remains stationary (does not rotate), base 20 remains in fixed location along threaded shaft 24 as wing knob 34 is rotated on shaft 24 to move it away from base 20. This allows clamping disc 26 and washer 30 to be moved along threaded shaft 24 away from base 20, such as shown in FIG. 1, a distance sufficient to insert the edge of sheet material to be clamped, such as sheet material 40, FIG. 5, between base 20 and clamping disc 26. When the sheet material is positioned between base 20 and clamping disc 26, wing knob 34 is rotated on shaft 24 to move it toward base 20. This will move washer 30 and clamping disc 26 toward and then against base 20 so that the sheet material 40 is sandwiched between the inner base surface 20b of base 20 and the inner disc surface 26b of clamping disc 26, as shown in FIG. 5. Wing knob 34 is tightened against washer 30, clamping disc 26, and base 20 to the extent necessary to tightly hold the edge of sheet material 40 sandwiched between the inner base surface 20b of base 20 and the inner disc surface 26b of clamping disc 26.

Clamping disc 26 is made of a material, or at least inner disc surface 26b is coated with a material, providing a slip resistant inner disc surface 26b which will resist movement of sheet material 40 being held between inner base surface 20b and inner disc surface 26b. While various coatings and materials can be used, it has been found advantageous to make clamping disc 26 of a slip resistant and substantially shape retaining but slightly resilient material such as crumb rubber pad material made of an emulsion styrene-butadiene rubber (E-SBR). E-SBR is a polymer widely used in the production of tires for cars and trucks, it also has other uses including house-ware mats, shoe soles and heels, brake and clutch pads, and the like. An E-SBR crumb rubber pad material is made of recycled tires which are granulated and processed into a mat. In the clamp of the invention, it provides a resilient but substantially shape retaining material with a somewhat rough surface that provides a sufficient frictional force that resists the slipping of the sheet material from between the base and clamping disc. As a disc, the desired material should be shape retaining to the extent that it maintains its disc shape and can apply compressive and holding force against the sheet material to be held between the clamping disc and the base without excessive compression of the clamping disc, but with sufficient resilience so that the outer edge 26c of the inner disc surface will compress and bend slightly under force applied by the sheet material being clamped as it passes over the outer edge 26c of the inner disc surface 26b as shown in FIG. 5 to reduce the chance of tearing the sheet material. Mats sold by IFA (Intermountain Farmers Association) Country Stores in Salt Lake City, Utah, as trailer mats ½ inch thick by 4 feet by 7 feet and identified by Article No. 14339 (made by North West Rubber Ltd. of Abbotsford, BC, Canada), which come as flat mats, has been found satisfactory for the crumb rubber mat material. The inventors have cut discs with a diameter of about two and three quarter inches from these mats for use in the prototype clamps of the invention. Any other material that is resilient and slip-resistant can provide a similarly effective material for the clamping disc. In the embodiment of FIGS. 1-5, the base 20 is also in the form of a disc and advantageously made of the same crumb rubber mat material as the clamping disc 26 so as to provide slip resistant surfaces for both the inner disc surface 26b and the inner base surface 20b. This provides slip resistant surfaces for both sides of the sheet material held between the clamping disc and the base.

Washer 30 against the outer disc surface 26a of disc 26 spreads the clamping pressure produced by wing knob 34 against disc 26 over the entire area of the washer. This is particularly beneficial when the clamping disc 26 is made of the slightly resilient material described above so that clamping pressure is applied by the washer 30 through the clamping disc to the sheet material over a substantial portion of the clamping surface (inner clamp surface 26b) in contact with the sheet material 40 being clamped. Further, the diameter of washer 30 is less than the diameter of clamping disc 26 so as to leave a small outer circumferential portion 26d of clamping disc 26 uncovered by the washer 30 which, with the slightly resilient material described above, will slightly increase the resilience of the outer edge 26c of the inner disc surface 26b.

Figure 2:
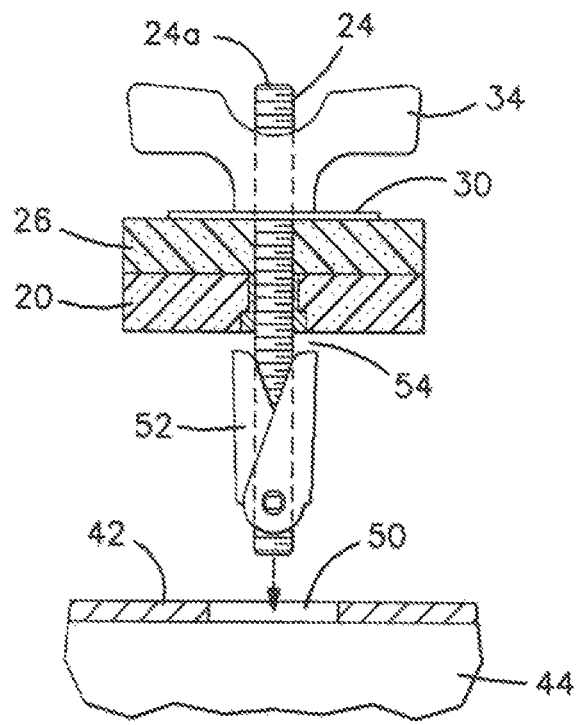
FIG. 2 is a vertical section of the frictional tarp clamp of FIG. 1, but with the toggle bolt in closed position and located above a fragmentary showing of a stake pocket hole into which the clamp will be inserted.
Figure 3:
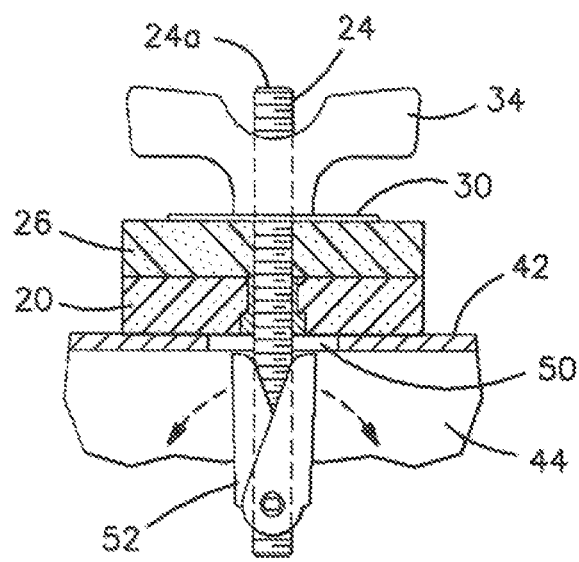
FIG. 3 is a vertical section of the frictional tarp clamp of FIG. 2 after insertion into the stake pocket hole.
Figure 4:
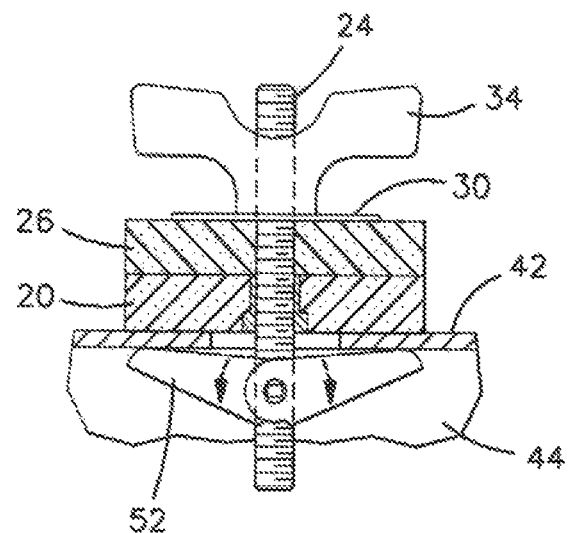
FIG. 4 is a vertical section of the frictional tarp clamp secured in the stake pocket hole showing the toggle bolt in open secured position.
Figure 8:
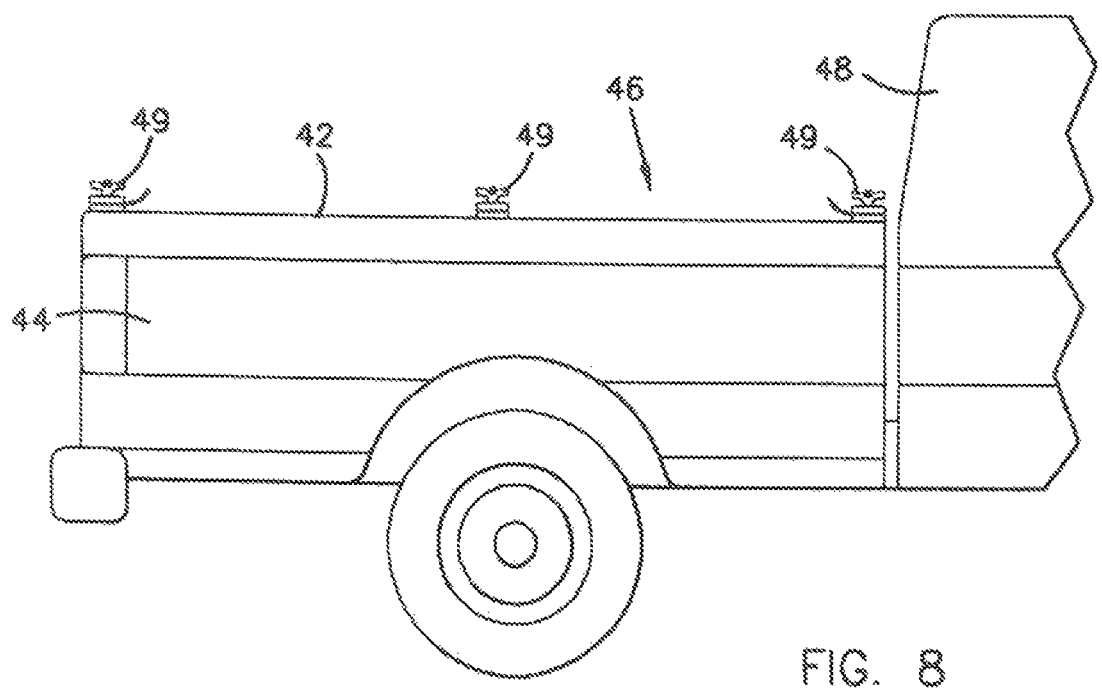
FIG. 8 is a side view of a truck illustrating use of an embodiment of the present invention.

The embodiment of the clamp shown in FIGS. 1-5 is designed to be attached to the tops 42 of the side walls 44 defining the bed 46 of a pickup truck 48, which, in the embodiment shown, can be easily accomplished by securing the clamp, shown generally in FIG. 8 by reference number 49, in stake pocket holes 50, FIGS. 2-5, which are often provided in the top 42 of the side walls 44. If provided, these stake pocket holes are usually provided near the front and rear of the top of the side walls with usually at least one pocket provided intermediate the front and rear of the side walls, as indicated by the positions of the attached clamps 49 shown in FIG. 8. Similar stake pocket holes are often provided along the sides of the bed of flatbed trucks and often are formed by brackets, not shown, attached along the sides of the flat bed. FIGS. 1-5 show threaded shaft 24 extending through base 20 and extending from the outer base surface 20a of base 20. A toggle bolt 52 is threaded onto the portion of threaded shaft 24 extending from the outer base surface 20a. To mount the clamp in the stake pocket hole 48, or in a similar hole extending through a surface to which the clamp is to be attached, wing knob 34 is screwed toward, and almost to, end 24a of threaded shaft 24. Base 20 is then also screwed toward end 24a of threaded shaft 24 with clamping disc 26 and washer 30 between base 20 and wing knob 24 until there is sufficient space along threaded shaft 24 between toggle bolt 52 and base 20 to allow toggle bolt 52 to be folded to its closed position as shown in FIGS. 2 and 3 with enough space 54 between the folded end of toggle bolt 52 and base 20 to allow the portion of threaded shaft 24 with folded toggle bolt 52 thereon to be inserted through stake pocket hole 50, FIG. 3, and to allow folded toggle bolt 52, FIG. 3, to unfold to its open position as shown by broken line arrows in FIG. 4. Base 20 can then be screwed on threaded shaft 24 to move it along threaded shaft 24 toward now open toggle bolt 52 to sandwich side wall top 42 on opposite sides of stake pocket holes 50 between base 20 and open toggle bolt 52, as shown in FIG. 4. During this mounting operation it may be necessary to prevent rotation of threaded shaft 24. This can be accomplished by pulling threaded shaft 24, such as by holding and pulling wing knob 34 or clamping disc 26 to move open toggle bolt 52 against the back side of side wall top 42 as shown in FIG. 4 so that base 20 can be easily screwed to move it along threaded shaft 24 into contact with side wall top 42 as shown in FIG. 4. Once in this position, base 20 can be tightened against side wall top 42 to securely mount the clamp in stake pocket hole 50. With base 20 made of the crumb rubber pad material described above, base 20 can be tightened against side wall top 42 without base 20 scratching or otherwise damaging side wall top 42. Upon initial installation of the clamp in stake pocket hole 50, wing knob 34 will be positioned spaced from base 20 a distance so that clamping disc 26 and washer 30 can freely slide along threaded shaft 24 to provide space between base 20 and clamping disc 26 such as shown in FIG. 1. In this condition, a portion of sheet material 40 to be clamped can be positioned between base 20 and clamping disc 26, such as shown in FIG. 5, and wing knob 34 can then be screwed along threaded shaft 24 to tighten clamping disc 26 against base 20 to hold the portion of sheet material 40 between clamping disc 26 and base 20 in clamped position in the clamp. With threaded shaft 24 holding clamping disc 26 in position with respect to base 20, material 40 will be positioned in only a portion of the area between clamping disc 26 and base 20 as shown in FIG. 5 with material 40 shown clamped between clamping disc 26 and base 20 on the left side of threaded shaft 24. However, this has been found to be sufficient to securely hold material 40 clamped between clamping disc 26 and base 20. Material 40 clamped between clamping disc 26 and base 20 can be released by screwing wing knob 34 to move it along threaded shaft 26 away from washer 30, clamping disc 26, and base 20. Sheet material to be clamped can be clamped or released as desired by tightening or loosing wing knob 34.

The embodiment of the clamp of the invention shown in FIGS. 1-5 can be secured to any surface having a hole or opening therethrough similar to the opening 50 described as a stake pocket hole often provided in a pickup or flatbed truck. If such a hole is not provided, a similar hole of size to allow the folded toggle bolt to be inserted therethrough can be drilled or cut to allow similar installation of the clamp. If the clamp is to be mounted to a surface where both sides of the surface is open to a user, rather than using a toggle bolt, the threaded shaft extending from the outer base surface can be inserted through a hole through the surface and a conventional nut or wing knob can be threaded onto the threaded shaft, with or without a washer depending upon the size of the hole and nut, and used to secure the clamp to the surface with the material forming the surface sandwiched between the nut and the base.

When using clamps of FIGS. 1-5 with a pickup truck or flatbed truck to cover a load carried in or on the bed of such truck, a plurality of clamps of the invention are mounted around the bed of such truck, such as along opposite sides of the bed 46 as shown in FIG. 8. The sheet material is then placed over the load and edges of the sheet material, which edges may be formed by folding the sheet material so the sheet material will adequately and substantially tautly cover the load on the bed, are clamped in the clamps of the plurality of clamps. The usual purpose of covering a load in or on the bed of a truck is to either prevent the load from blowing out of the bed during driving of the truck or to protect the load in or on the bed during driving of the truck. The truck is often driven at relatively high speed which subjects the cover to substantial winds and wind currents which create powerful forces on and in the cover tending to blow the cover off of the truck bed. Many of these forces are sudden and varying forces rather than steady. It is therefore important that the clamps holding the sheet material over the load securely hold the sheet material so it does not blow off of the load and that the clamps holding the sheet material resist tearing the sheet material which would then allow the material to blow off the load. The inventors have found that by forming at least one of the clamping surfaces, i.e., at least one of the inner clamping surface or the inner base surface, of a relatively high friction material as opposed to a smooth hard surface such as a rigid plastic surface or metal surface, the sheet material is more securely held in the clamp and that by providing smoothly curved edges for the clamp, such as the rounded edges of the clamping disc formed by the disc shape and the somewhat resilient and compressible material forming the circumferential edge against which the sheet material is impacted against by the sudden forces acting on the sheet material during driving, the hard edges tending to tear the sheet material when impacting such edges is significantly reduced. The inventors have found that the life of sheet material used to cover truck loads during driving is significantly prolonged by the clamps of the invention compared to other commercially available clamps they have tested.

While the clamp of the invention can be made in various sizes, it has been found that a clamp as illustrated in FIGS. 1-5 with base disc 20 and clamping disc 26 both having a diameter of about two and three quarter inches and with washer 30 having a diameter of about two inches can securely hold sheet material such as sheet plastic or traditional tarp sheet material in position without tearing such material during driving.

Figure 6:
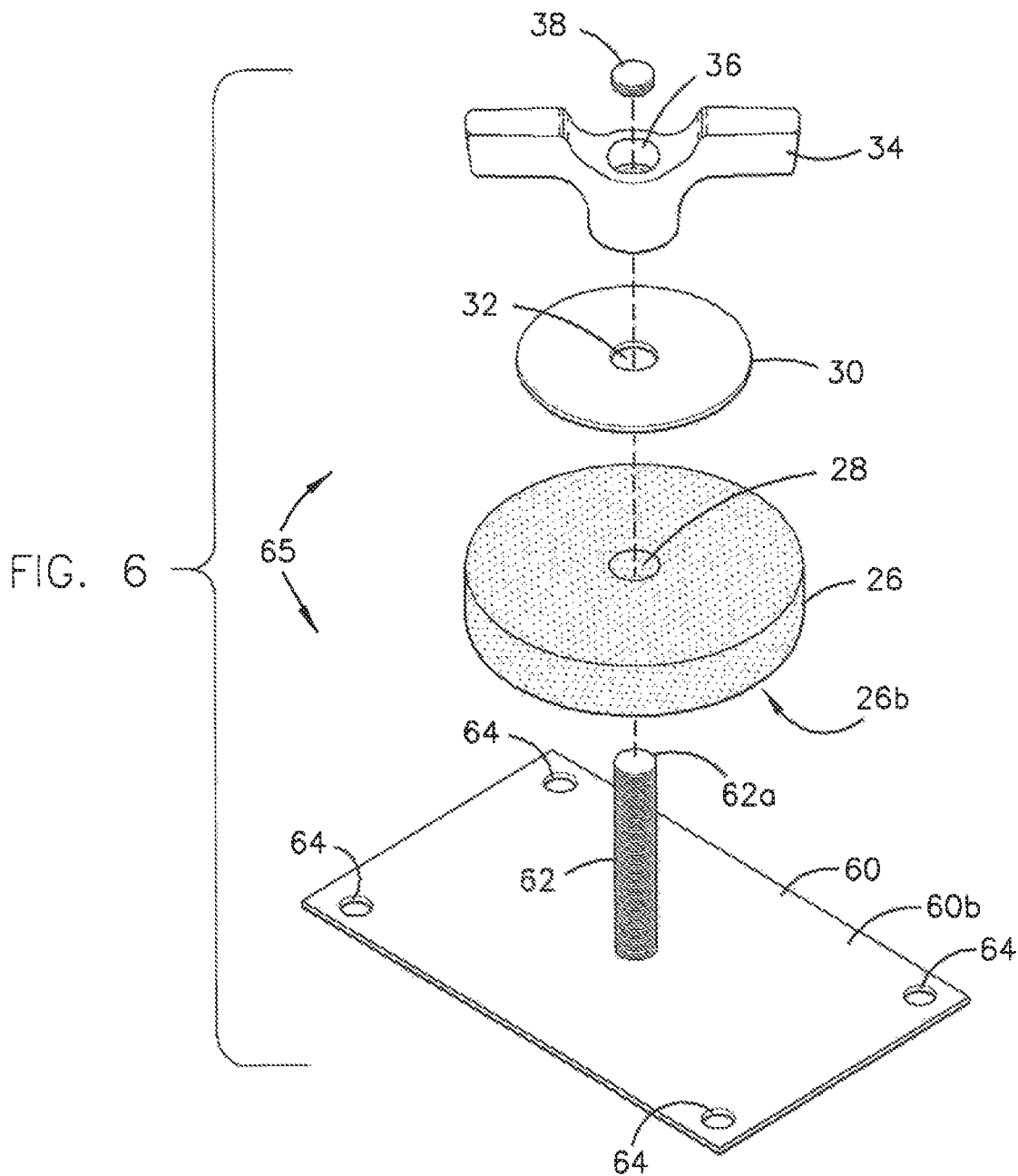
FIG. 6 is a perspective assembly view of another embodiment of the frictional tarp clamp in accordance with the present invention.

In a second embodiment of the invention, shown in FIG. 6, a base 60 takes the form of a rigid metal plate with a threaded shaft 62 secured to the base 60, such as by welding, extending from the inner base surface 60*b*. The clamping disc 26 is received on threaded shaft 62 with threaded shaft 62 extending through non-threaded disc opening 28. Similarly, the washer 30 is received on threaded shaft 62 with threaded shaft 62 extending through non-threaded washer opening 32. This allows clamping disc 26 and washer 30 to slide along threaded shaft 62 toward and away from base 60. Wing knob 34 is threaded onto threaded shaft 62 similarly to the way it is threaded onto shaft 24 of the embodiment of FIGS. 1-5, and the end 62*a* of shaft 62 may be treated to prevent wing knob from being screwed off the end 62*a* of shaft 62. The operation of the clamp is as previously described with sheet material to be clamped inserted between clamping disc 26 and base 60 and with wing knob 34 being screwed along threaded shaft 62 to tighten washer 30 and clamping disc 26 against inner surface 60*b* of base 60, to thereby clamp the sheet material between inner disc surface 26*b* of clamping disc 26 and inner surface 60*b* base 60. Clamping disc 26 is similarly advantageously made of a crumb rubber mat material.

Figure 9:
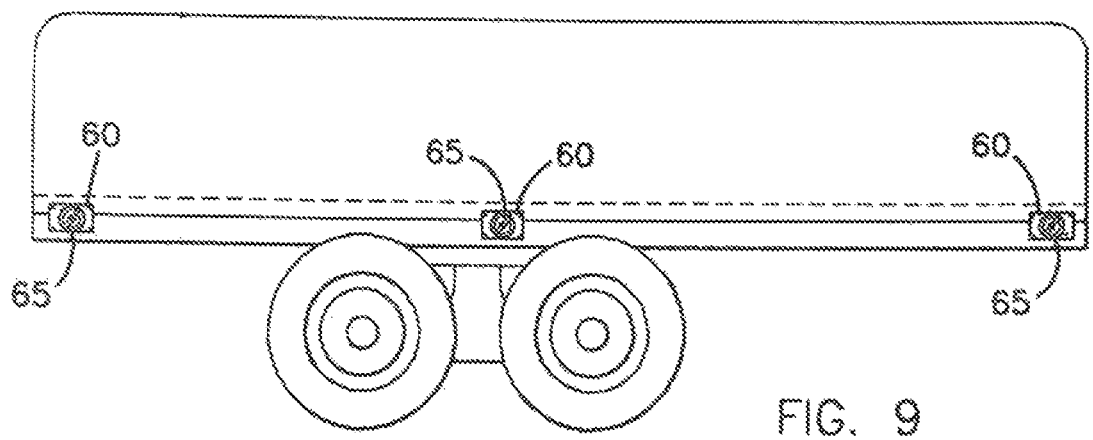
FIG. 9 is a side view of a flatbed trailer showing use of an embodiment of the invention.
Figure 10:
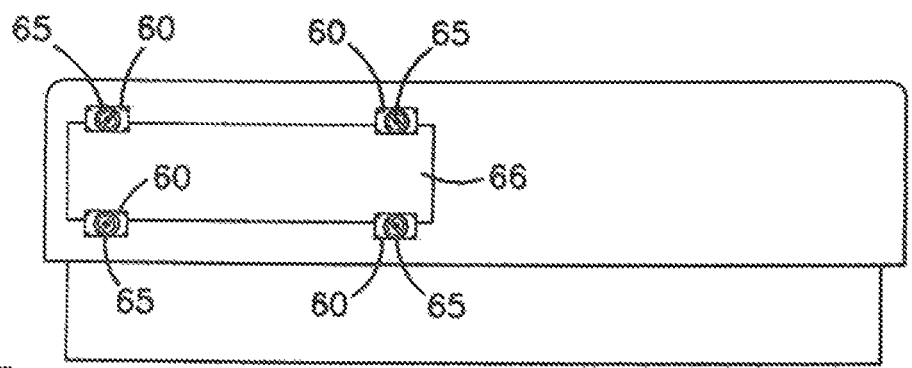
FIG. 10 is a side view of a building illustrating use of an embodiment of the invention.

In this second embodiment, base 60 includes holes 64, such as positioned at the corners thereof, by which base 60 can be secured to a surface, such as by screws or nails. For example, base 60 can be screwed with screws through holes 64 onto the side of a flatbed trailer as shown in FIG. 9. For another example, when replacing a roof on a building, the old roof or portions thereof are removed so the new roof can be installed. It is not uncommon for portions of the old roof to be removed and before the new roof can be installed, a storm approaches the building and rain or snow from the storm fall on the open roof and leak into the building. With the embodiment of clamp shown in FIG. 6, upon approach of the storm, a plurality of the clamps 65 of FIG. 6 can be positioned around the portion of the old roof that has been removed, see FIG. 10, and the bases 60 of the plurality of clamps can be quickly nailed through holes 64 to the roof and sheet material 66 can be clamped in position over the portion of the roof that has been removed to prevent rain or snow from the storm entering the building.

While base 60 could include a sheet of crumb rubber material to increase the frictional holding ability of the inner surface of the base, it has been found that the holding ability of the crumb rubber material of the clamping disc is generally sufficient to hold the sheet material in the clamps and that the thin flat profile of the base plates 60 hold the edges of the sheet material close to the roof surface to minimize wind blowing underneath the sheet material to prevent the sheet material from blowing out of the clamps and off of the roof. The clamps of FIG. 6 can be used in various other situation such as if a pile of material is to be covered to protect it from the weather, a frame, such as a wood frame, can be assembled around the pile and bases 60 of a plurality of the clamps of FIG. 6 can be nailed through holes 64 to the frame and sheet material can be positioned over the pile of material to be protected and be clamped in position over the pile of material.

Figure 7:
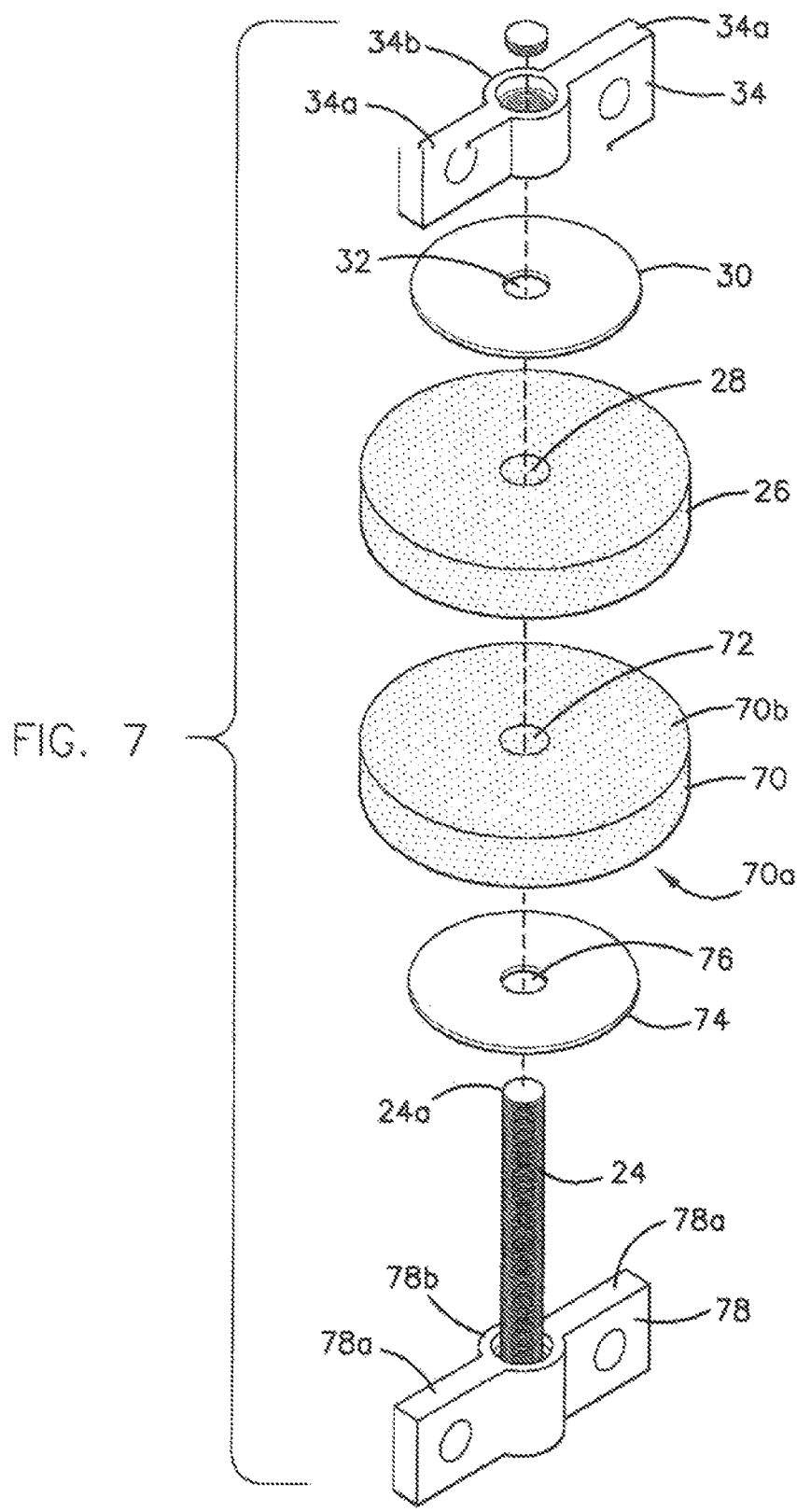
FIG. 7 is a perspective assembly view of a further embodiment of the frictional tarp clamp of the present invention.

Another embodiment of the invention, illustrated in FIG. 7, can be used to clamp pieces of sheet material together or to clamp portions of a sheet of sheet material together. For example, where an item positioned off the ground, such as a boat positioned on a boat trailer, is to be covered and protected by a piece of sheet material, it is desirable to connect the edges of the sheet material positioned over the boat where they come together under the boat. In such instance, a clamp to connect two edges of the sheet material together rather than to clamp an edge of the sheet material to a separate item, such as a truck body or a roof, is desired. In such embodiment, the base can take the same form as the clamping disc. As shown in FIG. 7, a clamp can be assembled with a base 70 having the identical construction as the clamping disc 26 of prior embodiments. In such embodiment, the base 70 has a non-threaded opening 72, which allows the base 70, similarly to clamping disc 26, to slide along the threaded shaft 24. The base 70 has an outer base surface 70*a* and an inner base surface 70*b*. Also, similarly to the clamping disc 26, a washer 74 is received on threaded shaft 24 with threaded shaft 24 extending through non-threaded washer opening 76. This allows washer 70 to slide along threaded shaft 26 with base 70. Wing knob 78 is threaded onto the end of threaded shaft 24 opposite the end 24*a* and that end of shaft 24 may also be treated to prevent wing knob 78 from being screwed off the end of shaft 24. In clamping the sheet material two edges of the sheet material to be clamped together are inserted between base 70 and clamping disc 26 and either wing knob 34 or wing knob 78, or both are screwed to move the wing knobs 34 and 78 toward one another which moves the base 70 and the clamping disc 26 toward one another. This continues until the clamping disc 26 is against base 70 with the edges of the sheet material to be joined between the clamping disc 26 and base 70. Wing knobs 78 and/or 34 are tightened to apply clamping pressure on the two edges of the sheet material to be joined. Depending upon the orientation of the pieces to be joined, the two pieces can be overlapped and joined together on one side of the clamp, or the two pieces can be inserted, each on an opposite side of the clamp or in partially overlapping orientation. Further, more than two pieces can be inserted between the base and clamping disc to be clamped together.

In some cases, two different sections of two different tarps might need to be connected so that a large pile of material, such as a haystack, can be covered without needing an even larger tarp. These two tarps can be connected together by placing sections from the two tarps between the base 70 and the clamping disc 26 of this embodiment just described. The two sections of the two tarps can be securely held by tightening one or both of the wing knobs, 34 and 78, so that the base 70 moves towards the clamping disc 26.

It should be noted that the clamping discs 34 and 78 shown in FIG. 7 include handles or thumb knobs 34*a* and 78*a* with upper and lower surfaces that extend from central portions 34*b* and 78*b* in straight lines so that, when tightened against washers 30 and 74, such thumb knobs contact and exert clamping pressure over the entire diameter of respective washers 30 and 74 to tend to keep washers 30 and 74 flat and prevent the outer portions of such washers from bending outwardly. This tends to keep the pressure exerted by washers 30 and 74 on clamping disc 26 and on base 70 even over the full diameter of the washers. Thumb knobs with this configuration can be used in any of the embodiments of the clamp of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A clamp for use with sheet material, said clamp comprising:
    a base, with an inner surface and an outer surface, wherein a threaded shaft extends from the base;
    a clamping disc, with an inner surface and an outer surface, comprised of a slightly resilient and slip-resistant material, wherein the clamping disc has a non-threaded opening, and wherein the non-threaded opening of the clamping disc is slidably received on the threaded shaft wherein the clamping disc can slide on the threaded shaft toward or away from the inner surface of the base;
    a substantially rigid washer, with an inner surface and an outer surface, wherein the washer has a non-threaded opening, wherein the non-threaded opening of the washer is slidably received on the threaded shaft wherein the washer can slide on the threaded shaft toward or away from the outer surface of the clamping disc; and
    a fastener with a threaded opening, wherein the fastener mates with the threaded shaft and reversibly tightens the clamping disc toward the inner surface of the base;
    wherein the base comprises a metal surface that is attached to an end of the threaded shaft;
    wherein the base contains multiple holes by which the base is configured to be attached to a mounting surface.

2. The sheet material clamp, as set forth in claim 1, additionally including a stop at the end of the threaded shaft extending from the inner surface of the base to prevent the fastener from being screwed off the end of the threaded shaft.

3. The sheet material clamp, as set forth in claim 2, wherein the stop is a plastic material secured to the end of the threaded shaft.

4. A clamp for use with sheet material, said clamp comprising:
- a substantially rigid base, with an inner surface and an outer surface, wherein a threaded shaft extends from the inner surface of the base;
- a clamping disc, with an inner surface and an outer surface, comprised of a slightly resilient and slip-resistant material, wherein the clamping disc has a non-threaded opening, and wherein the non-threaded opening of the clamping disc is slidably received on the threaded shaft wherein the clamping disc can slide on the threaded shaft toward or away from the inner surface of the base;
- a substantially rigid washer, with an inner surface and an outer surface, wherein the washer has a non-threaded opening, wherein the non-threaded opening of the washer is slidably received on the threaded shaft wherein the washer can slide on the threaded shaft toward or away from the outer surface of the clamping disc; and
- a fastener with a threaded opening, wherein the fastener mates with the threaded shaft and reversibly tightens the clamping disc toward the inner surface of the base; wherein the substantially rigid base is formed by a substantially rigid plate and the substantially rigid plate contains at least one hole therethrough by which the substantially rigid plate is configured to be attached to a mounting surface.

5. The sheet material clamp as set forth in claim 4, wherein the substantially rigid plate is a metal plate.

6. The sheet material clamp as set forth in claim 4, wherein the at least one hole comprises a plurality holes through the substantially rigid plate positioned at corners of the substantially rigid plate configured to receive fasteners therethrough to attach the substantially rigid plate to the mounting surface.

7. The sheet material clamp as set forth in claim 6, wherein the substantially rigid plate includes a layer of slightly resilient and slip-resistant material positioned on the inner surface of the substantially rigid plate adjacent the threaded shaft.

8. The sheet material clamp as set forth in claim 4, wherein the inner surface of the substantially rigid base includes a layer of slightly resilient and slip-resistant material positioned on the inner surface of the substantially rigid base adjacent the threaded shaft.

9. The sheet material clamp, as set forth in claim 4, additionally including a stop at the end of the threaded shaft extending from the inner surface of the base to prevent the fastener from being screwed off the end of the threaded shaft.

10. The sheet material clamp, as set forth in claim 9, wherein the stop is a plastic material secured to the end of the threaded shaft.

* * * * *